United States Patent [19]

Fukui et al.

[11] Patent Number: 4,534,812
[45] Date of Patent: Aug. 13, 1985

[54] METHOD FOR FORMING TIRES

[75] Inventors: Yoshihiro Fukui, Hadano; Isamu Tuchiya, Nirayama; Shun Yoshida, Kamakura, all of Japan

[73] Assignee: Zeon Kosan Co., Ltd., Chuo, Japan

[21] Appl. No.: 584,324

[22] Filed: Feb. 28, 1984

[51] Int. Cl.³ .............................................. B29H 17/22
[52] U.S. Cl. .................................... 156/132; 156/133; 156/289; 156/401; 156/416; 264/130; 264/326; 425/48; 425/502
[58] Field of Search ............... 156/132, 133, 123, 131, 156/289, 401, 416, 110.1, 421.2, 421.6, 128.1, 130.7; 264/130, 326; 425/48, 502

[56] References Cited

U.S. PATENT DOCUMENTS 3,101,289  8/1963  Giletta et al. .................. 156/133
3,483,062 12/1969  Madge ............................ 156/401
3,506,514  4/1970  D'Avello et al. ............... 156/132
3,932,255  1/1976  Saracsan ........................ 156/401
4,416,720 11/1983  Baldoni ....................... 156/132 X Primary Examiner—Edward Kimlin
Assistant Examiner—Thomas Bokan
Attorney, Agent, or Firm—Bucknam and Archer

[57] ABSTRACT

A method for forming tires by the use of a tire-forming machine having a drum bladder and a turnup bladder. An organic halogen compound having in the molecule thereof a

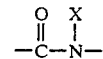

bond, in which X represents a halogen atom, is applied to the surfaces of the drum bladder and turnup bladder of the machine to form a layer of the organic halogen compound, whereby unvulcanized rubber for tires is prevented from sticking to said bladders during the formation of tires form the unvulcanized rubber.

5 Claims, 2 Drawing Figures

METHOD FOR FORMING TIRES

BACKGROUND OF THE INVENTION

1. Field of the Invention

This invention relates to a method for forming tires and more particularly, to an improvement in forming tires wherein a specific type of anti-sticking agent is applied to a drum bladder and a turnup bladder (hereinafter sometimes referred to generically as bladders) of a tire-forming machine, thereby preventing an unvulcanized rubber for tires from sticking to the bladders.

2. Description of the Prior Art

In preventing an unvulcanized rubber for tires from sticking to vulcanized rubber-made bladders of a tire-forming machine, it is the common practice to apply thereto solid or liquid release agents such as zinc stearate, paraffin wax and surface active agents. However, these agents undesirably need reapplication thereof every cycle of the tire forming or after several forming cycles. In addition, these agents have another disadvantage that when deposited on the unvulcanized rubber for tire, they will lower the quality of the resulting final tire depending on the type and amount thereof.

In order to solve the above problems, Japanese Laid-open Utility Model Application No. 51-150270 discloses a method in which a silicone rubber layer is formed on the surface of each bladder to give bladders of good release durability. Although this method is effective in improving the durability of release of the bladders from unvulcanized rubber, the bladders made of vulcanized rubber may be readily broken due to separation of the thus formed silicone rubber layer therefrom. This is because no technique is known for achieving a satisfactory bond between the bladders made of vulcanized rubber and the silicone rubber layer. Thus, practically adequate durability cannot be obtained. In order to overcome the ready breakage of such bladders, Japanese Laid-open Utility Model Application No. 56-41629 proposes a method using bladders made wholly of silicone rubber. Because of the substantial lack of physical strength of silicone rubber, however, the bladders so proposed have yet the disadvantage of being readily broken.

In view of the above, there have never been known any techniques of effectively preventing the sticking of unvulcanized rubber for tires to bladders made of vulcanized rubber, which sticking is invariably involved in methods of forming tires using tire-forming machines.

SUMMARY OF THE INVENTION

It is an object of the present invention to provide a method for forming tires by the use of a tire-forming machine, which method overcomes the disadvantages of the prior art.

It is another object of the invention to provide a method for forming tires in which a specific type of anti-sticking agent is applied to the drum bladder, turnup bladder and/or expand drum cover of a tire-forming machine thereby preventing unvulcanized rubber for tires from sticking to the bladders and improving the release durability thereof.

The above objects may be achieved by a tire forming method using a tire-forming machine including bladders (a drum bladder and a turnup bladder), the method comprising applying an organic halogen compound having in the molecule a

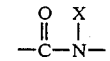

bond (in which X represents a halogen) to the surfaces of the bladders to form a layer of the organic halogen compound thereon, whereby sticking of unvulcanized rubber for tires to the bladders is prevented during the course of the formation of tires from the unvulcanized rubber.

DETAILED DESCRIPTION OF THE INVENTION

Figure 1:
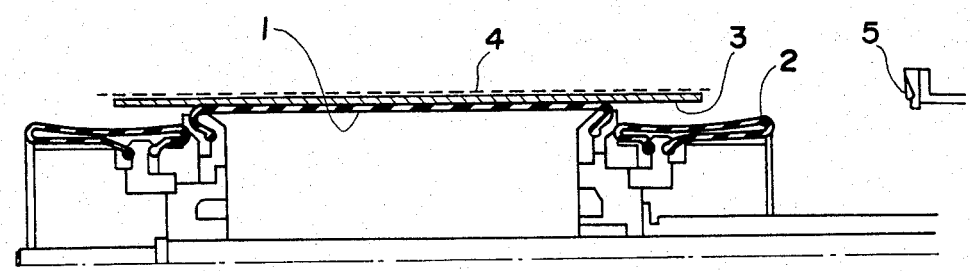
FIG. 1 is a schematic sectional view of the upper half of a radial tire-forming machine.

The organic halogen compounds used in the present invention should have in the molecule a

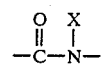

bond (in which X represents a halogen) to exhibit prevention of stickiness of an unvulcanized rubber when used. Examples of the organic halogen compound include halogenated succimides such as N-bromosuccimide, halides of isocyanuric acid such as trichloroisocyanuric acid and dichloroisocyanuric acid, and halogenated hydantoins such as dichlorodimethyl hydantoin. Of these, the halides of isocyanuric acid are particularly preferable.

Application of these organic halogen compounds onto the surfaces of the bladders even in small amounts will show an anti-sticking effect. Preferably, the amount is in the range of 3 to 15 g/m$^2$. Smaller amounts will result in a poorer effect. Larger amounts are not favorable because the release effect is not improved so much and the rubber of the bladders deteriorates by hardening to decrease the bending fatigue resistance and the life of the bladders.

The organic halogen compound may be applied to the bladder surfaces in the form of a solution in solvent which does not react therewith. Examples of such solvent include aromatic hydrocarbons such as benzene and xylene, ethers such as diethyl ether, dioxane and tetrahydrofuran, esters such as ethyl acetate, ketones such as methyl ethyl ketone and cyclohexanone, chlorinated hydrocarbons such as ethyl chloride, chloroform and carbon tetrachloride, and tertiary alcohols such as tertiary butyl alcohol. These solvents may be used singly or in combination. Although the concentration of the organic halogen compound in the solution may vary depending on the solubility of the organic halogen compound in solvent and the boiling point of solvent, it is generally in the range of from 0.1 to 20 wt.%, preferably from 0.5 to 10 wt.%. The use of the halogen compounds in these concentrations will exhibit improved anti-sticking effects. The working efficiency becomes poor at too low concentrations, whereas too high concentrations are disadvantageous in that the reaction between an applied organic halogen compound and the bladder rubber does not complete before the solvent is dried.

A solution of the organic halogen compound may be applied onto the bladder surfaces by dipping, brushing or spraying. Before drying of the solvent, the organic halogen compound reacts with the vulcanized rubber of the bladders at double bonds thereof thereby rendering the bladder surfaces non-sticky to unvulcanized rubber for tires. The polymers used in the rubber for bladders should contain at least 5 parts by weight of a polymer having double bonds in the molecule per 100 parts by weight of the polymers. Examples of the double bond-containing polymers include natural rubber, synthetic polyisoprene rubber, styrene-butadiene rubbers, polybutadiene rubber, chloroprene rubber, nitrile-butadiene rubbers and ethylene-propylene-diene terpolymer rubbers.

The tire-forming process using a tire-forming machine is illustrated in the accompanying drawing. Tires can broadly be classified into two groups including radial tires and bias tires, respectively. Different types of tire-forming machines are used for the respective groups.

Reference is now made to FIG. 1, which shows the upper half, in section, of a typical forming machine for radial tires. The machine includes a drum bladder 1 and turnup bladders 2, each made of vulcanized rubber. In a bias tire-forming machine, the drum bladder 1 is made of a metal or a metal on which a rubber cover is provided. The turnup bladder 2 in the bias tire-forming machine is made of vulcanized rubber as in the radial tire-forming machine.

Figure 2:
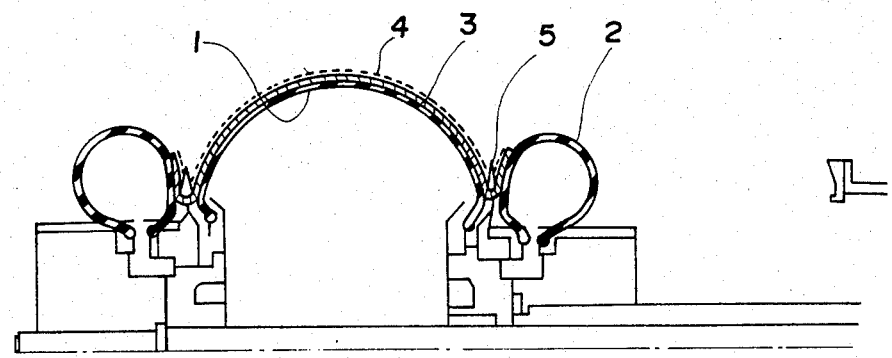
FIG. 2 is a sectional view of the drum bladder and turnup bladder, in the inflated state, of the tire-forming machine of FIG. 1.

In the tire-forming operation, a thin inner liner rubber sheet 3 is applied to the drum bladder 1 as shown, after which a carcass rubber sheet 4 is further applied to the thus applied drum bladder. Subsequently, the drum bladder 1 so treated is inflated as shown in FIG. 2 and simultaneously a bead 5 is bonded to the inflated sheets 3 and 4. Thereafter, the turnup bladders 2 are inflated so that the carcass rubber sheet 4 is folded to embrace the bead 5 in the end portion of the sheet 4. Next, the turnup bladders 2 are deflated to return to the original state of FIG. 1. To the carcass rubber sheet 4 which is mounted on the inflated drum bladder 1 are applied a belt rubber sheet, a tread rubber sheet and a side rubber sheet (not shown) for being laminated together. Finally, the inflated drum bladder 1 is deflated and the resulting unvulcanized tire is removed from the forming machine for subsequent operations.

In the course of a series of the above steps, it has been often experienced that when the turnup bladder 2 is deflated after folding the carcass sheet or when the drum bladder 1 is deflated after forming of the sheet assembly in order to remove the unvulcanized tire from the forming machine, sticking of the unvulcanized rubber tire to the bladders takes place. This causes the rubber tire to be deformed or deteriorated in lamination, thus impeding the workability considerably. In an extreme case, the unvulcanized rubber tire may be scrapped at this stage. This is properly solved in the practice of the invention by applying a solution of the organic halogen compound to the bladder surfaces as described above.

The present invention is more particularly described by way of examples and comparative examples.

EXAMPLES 1–4 AND COMPARATIVE EXAMPLES 1–3

In a radial tire-forming machine of a 165 SR 13 size comprising a drum bladder made of a vulcanized rubber obtained from the ingredients of Table 1 and having a surface area of 3300 cm$^2$, the drum bladder was coated separately with 50 g of each of an 0–5 wt.% solution of trichloroisocyanuric acid in ethyl acetate, a 5 wt.% solution of oleic acid in isopropyl alcohol, and a 3 wt.% suspension of zinc stearate in ethyl alcohol. Each solution was applied by brushing. Thereafter, the thus coated drum bladder was air-dried for 30 minutes to remove the solvent therefrom and was used for tire forming. The effect of the application and its durability obtained by one application were visually observed. The results are shown in Table 2. The release effect was determined as follows:

In Table 2, the symbol "o" indicates the smooth removal of a tire without deformation thereof at the time of deflation of the drum bladder after the end of formation of the tire, and the symbol "x" indicates the deformation of a tire with a part thereof being stuck to the drum bladder at the same time as above. The release effect durability by one application was indicated by the number of cycles of tire forming effected continuously by one application of each anti-sticking agent.

For the measurement of an adhesion strength between the drum bladder and the inner liner rubber sheet, the rubber composition of Table 1 was vulcanized at 150° C. for 30 minutes to form 2 mm thick sheets. The sheets so formed were dipped respectively in the treating solutions or suspension, followed by air-drying for 60 minutes to remove the solvent therefrom. The resulting vulcanized rubber sheets were each placed on a 2 mm thick unvulcanized rubber sheet for an inner liner, followed by pressing under a load of 2 kg/cm$^2$ at a temperature of 30° C. for 20 seconds to obtain a laminate which was cut into 1 inch wide pieces and subjected to a peel test at a peeling speed of 100 mm/minute by the use of a peeling tester to determine an adhesion strength. The results are shown in Table 2.

TABLE 1

| Composition | Parts by Weight |
| --- | --- |
| Natural rubber RSS #3 | 60 |
| Polybutadiene of high cis bonds | 40 |
| Carbon black (HAF) | 45 |
| Zinc oxide (#3) | 5 |
| Stearic acid | 2 |
| Antioxidant (H) *1 | 0.2 |
| Aroma oil | 6 |
| Vulcanization accelerator (CZ) *2 | 1.0 |
| Sulfur | 1.8 |

*1: N,N'—diphenyl-p-phenylenediamine
*2: Cyclohexyl benzothiazylsulfenamide

TABLE 2

| | Example and Comparative Example No. | | | | | | |
| --- | --- | --- | --- | --- | --- | --- | --- |
| Treating Solution (wt. %) | Com. Ex. 1 | Ex. 1 | Ex. 2 | Ex. 3 | Ex. 4 | Com. Ex. 2 | Com. Ex. 3 |
| Trichlorocyanuric acid | 0 | 0.5 | 1.0 | 2.5 | 5.0 | | |
| Oleic acid | | | | | | 5.0 | |
| Zinc stearate | | | | | | | 3.0 |

TABLE 2-continued

| Treating Solution (wt. %) | Com. Ex. 1 | Ex. 1 | Ex. 2 | Ex. 3 | Ex. 4 | Com. Ex. 2 | Com. Ex. 3 |
|---|---|---|---|---|---|---|---|
| Ethyl acetate | 100 | 99.5 | 99.0 | 97.5 | 95.0 | | |
| Isopropyl alcohol | | | | | | 95.0 | |
| Ethyl alcohol | | | | | | | 97.0 |
| Results of Measurement | | | | | | | |
| Adhesion strength (g/inch) | 470 | 165 | 135 | 120 | 85 | 30 | 140 |
| Application Effect | x | o | o | o | o | o | o |
| Durability of the Effect | 0 | 73 | 517 | 1835 | 2370 | 4 | 2 |

As will be seen from the results of Table 2, application of ethyl acetate alone in Comparative Example 1 shows no release effect because of high strength of adhesion of the unvulcanized rubber sheet to the ethyl acetate-treated vulcanized rubber sheet. The rubber sheets of Comparative Examples 2 and 3 in which the oleic acid solution and the zinc stearate solution were respectively used as indicated in Table 2, exhibit poor release effect durability though they are low in adhesion strength and thus show the release effect. In contrast, the rubber sheets of Examples 1 through 4 in which the trichloroisocyanuric acid solutions were respectively used as indicated in Table 2, have a low adhesion strength and high release effect with good durability.

EXAMPLES 5-7 AND COMPARATIVE EXAMPLES 4-5

In a radial tire-forming machine of a 185/75 HR 14 size, the drum bladder and turnup bladder thereof each made of vulcanized rubber obtained from the ingredients of Table 1 were coated respectively with the treating solutions indicated in Table 3. The application was effected by the use of a brush in an amount of 8 g/m², calculated as the effective ingredient. Thereafter, the bladders were air-dried on the surfaces thereof to remove the solvent therefrom, after which the machine was used for tire forming. The release effect and its durability by one application were observed in the same manner as in Example 1. The results are shown in Table 3.

TABLE 3

| | | Ex. 5 | Ex. 6 | Ex. 7 | Comp. Ex. 4 | Comp. Ex. 5 |
|---|---|---|---|---|---|---|
| Treating Solution (wt. %) | | | | | | |
| Trichlorocyanuric acid | | 5 | | | | |
| N—bromosuccinimide | | | 5 | | | |
| Dichlorodimethyl hydantoin | | | | 5 | | |
| Glycerine | | | | | 5 | |
| Ethyl acetate | | 95 | | | | 100 |
| Acetone | | | 95 | | | |
| Methyl ethyl ketone | | | | 95 | | |
| Isopropyl alcohol | | | | | 95 | |
| Results of Measurement | | | | | | |
| Drum bladder | Release effect | o | o | o | o | x |
| | Durability | 2018 | 1624 | 915 | 5 | 0 |
| Turnup bladder | Release effect | o | o | o | o | x |
| | Durability | 4572 | 3082 | 2655 | 13 | 0 |

As will be seen from Table 3, similar results are obtained when the treating solutions of the invention are applied to the drum and turnup bladders. Not only the trichlorocyanuric acid solution (Example 5), but also the N-bromosuccinimide solution (Example 6) and the dichloromethyl hydantoin solution (Example 7) are effective in improving the release effect and the durability. However application of the glycerine solution in Comparative Example 4 shows poor durability of the release effect. From the above, it will be appreciated that organic halogen compounds having

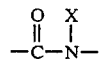

bonds (in which X represents a halogen) in the molecule are excellent as a release agent.

The organic halogen compounds can impart a good release property to the bladders and keep it over a long term. When the anti-sticking effect decreases, the release effect will be readily restored by reapplication of the compounds. In addition, the compounds are hardly transferred to an unvulcanized rubber for tires and thus the quality of the resulting tires is not lowered.

What is claimed is:

1. A method for forming tires by the use of a tire-forming machine including a drum bladder and a turnup bladder, the method comprising applying an organic halogen compound having in the molecule a

bond, in which X represents a halogen, to the surfaces of the drum bladder and turnup bladder to form a layer of the organic halogen compound thereon, whereby sticking of a unvulcanized rubber for tires to the bladders is prevented during the course of the forming of a tire from the unvulcanized rubber.

2. The method according to claim 1, wherein said organic halogen compound is applied in an amount of from 3 to 15 g/m².

3. The method according to claim 2, wherein said organic halogen compound is a halide of isocyanuric acid.

4. The method according to claim 2, wherein said organic halogen compound is in the form of an 0.1 to 20 wt.% solution thereof in a solvent.

5. The method according to claim 1, wherein the drum bladder and the turnup bladder are each made of polymers comprising at least 5 parts by weight of a polymer having double bonds therein per 100 parts by weight of the polymers.

* * * * *